(12) United States Patent
Desmone

(10) Patent No.: US 6,934,453 B2
(45) Date of Patent: Aug. 23, 2005

(54) FIBER OPTIC BRUSH LIGHT DETECTOR AND METHOD

(75) Inventor: Carolina C. Desmone, Cleveland, OH (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 10/701,425

(22) Filed: Nov. 6, 2003

(65) Prior Publication Data
US 2005/0100307 A1 May 12, 2005

(51) Int. Cl.$^7$ ................................................. G02B 6/04
(52) U.S. Cl. ........................ 385/115; 385/111; 250/368
(58) Field of Search ................................ 385/111, 115, 385/121, 104, 110, 113; 250/253–269.8, 368

(56) References Cited

U.S. PATENT DOCUMENTS

| | | | | |
|---|---|---|---|---|
| 4,803,366 A | * | 2/1989 | Vieux et al. | 250/486.1 |
| 5,155,366 A | * | 10/1992 | Miller | 250/368 |
| 5,410,156 A | * | 4/1995 | Miller | 250/390.04 |
| 5,880,469 A | * | 3/1999 | Miller | 250/367 |
| 6,798,958 B2 | * | 9/2004 | Bourget et al. | 385/113 |
| 2001/0013510 A1 | | 8/2001 | Wiener-Avnear et al. | 219/121.69 |
| 2002/0074929 A1 | | 6/2002 | Taskar et al. | 313/467 |
| 2003/0106993 A1 | | 6/2003 | Chen et al. | 250/269.1 |
| 2003/0127582 A1 | | 7/2003 | Jones | 250/207 |
| 2003/0150994 A1 | | 8/2003 | Freund et al. | 250/368 |
| 2003/0156677 A1 | | 8/2003 | Francke | 378/1 |

OTHER PUBLICATIONS

"CsI(Tl), CsI(Na), CsI(pure), Cesium Iodide Scintillation Material", © 2002 Saint–Gobain Crystals & Detectors, pp. 1–2.
"Product Sheet—Retrievable MWD System", GEOLINK, printed Aug. 2002, p. 1.
"Data Sheet—MWD Gamma System", GEOLINK, printed Aug. 2003, p. 1.
"Model 43–1 Alpha Scintillator", © 2000 Ludlum Measurements, Inc., Aug. 22, 2003, pp. 1–2.
"Model 43–5 Alpha Scintillator", © 2000 Ludlum Measurements, Inc., Aug. 22, 2003, pp. 1–2.
"YAP(Ce) Yttrium Aluminum Perovskite Scintillation Material", © 2002 Saint–Gobain Ceramics & Plastics, pp. 1–2.
"The Gamma Densimeter", AWI, Aug. 22, 2003, pp. 1–2.
"Downhole Memory Gamma Logger", Micro–Smart Systems, Inc., Aug. 22, 2003, pp. 1–2.
"Scintillators and Phototubes", Cosmic Rays, Aug. 22, 2003, p. 1.

* cited by examiner

Primary Examiner—Brian Healy
Assistant Examiner—Charlie Peng
(74) Attorney, Agent, or Firm—Nixon & Vanderhye, P.C.

(57) ABSTRACT

A fiber optic brush including: an array of fiber optic bristles each having a first end forming a hollow chamber adapted to receive a scintillating material, and the bristles having a second end connectable to a photodetector such that light entering the first end of a bristle is conveyed by the bristle through the second end and to the photodetector.

25 Claims, 1 Drawing Sheet

FIBER OPTIC BRUSH LIGHT DETECTOR AND METHOD

BACKGROUND OF THE INVENTION

This invention relates to the field of scintillating detectors and particularly to the field of detection of light from a scintillating material.

Scintillation detectors are commonly used in down-hole drilling applications, including measurement-while-drilling (MWD), logging-while-drilling (LWD) and wireline logging techniques. In the search for new oil and gas deposits and mapping their extent, a number of measurements are made along the bore holes. Certain instruments placed down the bore hole irradiate the rock surrounding the bore hole and sense radiation emissions from the surrounding irradiated rock.

Radiation from the rock triggers light photon emissions from a scintillation material in the instrument. A photodetector, e.g., photomultiplier or photocell, detects the photons emitted by the scintillation material. Special photomultipliers may be used in the instrument that can withstand temperatures of up to 200° C. encountered several thousand meters underground in a bore hole. By counting the number of photons emitted by the scintillation material, the instrument generates data indicative of the condition of the surrounding rock.

In a conventional instrument, reflectors surround the scintillating material to direct photons to the photomultiplier. Photons can come from any portion or direction of the scintillating material. The photomultiplier does not surround the scintillating material to capture the photons. Traditionally, reflectors surround the scintillating material and provide a mechanism to ensure that all photons from the material are directed to the photomultiplier.

Conventional reflectors often do not direct all photons from the scintillating material to the photomultiplier. Some photons are not effectively reflected by the reflectors and, thus, are not detected by the photomultiplier. Lost photons can seriously degrade the quality of the measurement being made by the instrument. Photons can be lost due to insufficient reflection and loss of reflective properties of the reflectors within the scintillation detector. Further, the reflective properties of the detector may degrade over time due to exposure to a harsh environment (shock, vibration, and thermal expansion) that occurs in an oil-well logging application.

Traditionally, Teflon™ and ceramic reflectors have been mounted around the scintillation material to ensure that light photons are not lost. However, it is particularly difficult to capture photons with these traditional reflectors. For example, the photons emitted through the side or back end of the scintillation material may pass through or be adsorbed by gaps or corners in the reflectors. Moreover, these reflectors have a tendency to become transparent (and thus not reflective) or contain contaminants (which disrupt reflections). Teflon™ and ceramic reflectors tend to become transparent when they are exposed to optical fluids or high compressive pressures. Contaminants in the reflective materials tend to occur when the material is not extremely pure or is exposed to a humid environment, such that moisture becomes trapped in the pores of the reflective material. In view of these difficulties with reflectors, there is a long felt need for a device that reliably and effectively directs photons from a scintillation material to a photodetector.

BRIEF DESCRIPTION OF THE INVENTION

In a first embodiment the invention is a fiber optic brush including: an array of fiber optic bristles each having a first end forming a hollow chamber adapted to receive a scintillating material, and the bristles having a second end connectable to a photodetector such that light entering the first end of a bristle is conveyed by the bristle through the second end and to the photodetector.

In a second embodiment, the invention is a scintillating instrument comprising: a housing; a scintillating material mountable within the housing; a photodetector mountable within the housing; a fiber optic brush in the housing between an outer wall of the housing and the scintillating material, wherein said fiber optic brush further comprises: an array of fiber optic bristles each having a first end forming a hollow chamber around the scintillating material, wherein said first ends of the bristles abut the scintillating material, and said bristles having a second end adjacent the photodetector such that light entering the first end of a bristle is conveyed by the bristle through the second end and to the photodetector.

In a third embodiment, the invention is a method for capturing light photons emitted from a scintillating material and conveying the photons to a light detector comprising: orienting a plurality of first ends of fiber optic bristles to face an outer surface of said scintillating material; orienting a plurality of opposite ends of the bristles to face the photodetector, and capturing the light photons emitted by the scintillating instrument by the first ends of the bristles and conveying the photons through the bristles to the photodetector.

DETAILED DESCRIPTION OF THE INVENTION

Figure 1:
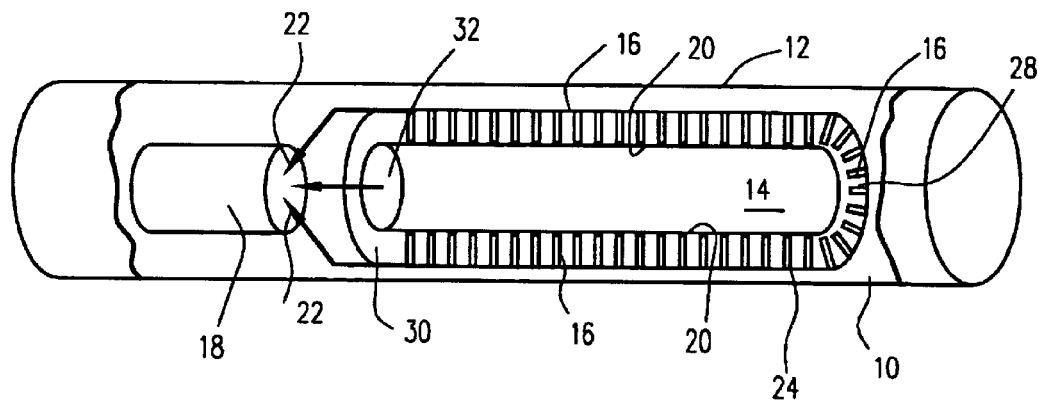
FIG. 1 is a schematic side view, partially in cross section, of an instrument having a fiber optic brush.

FIG. 1 shows a side view, partially in cross section, of an scintillating instrument 10, such as a gamma sensor for down hole bore testing. The instrument has a cylindrical housing 12, a rod of a scintillating material 14, and an annular array of fiber optic bristles 16 extending inward from the housing to an outer surface of the scintillating material. A photodetector 18, e.g., a photomultiplier tube or photocell, is mounted at an axial end of the instrument. However, the position of the photodetector may be shifted to suit the design of the instrument.

Each bristle 16 is a fiber optic line that conveys light photons from the scintillating material at one end of the line to an opposite end of the line that projects the photons into the photodetector. A first end 20 of each bristle is positioned adjacent a surface of the scintillating material 14. A light photon exiting the scintillating material 14 enters the end of a bristle 20 positioned on the scintillating surface where the photon exits. The light photon travels the length of the bristle to an opposite end 22 which is adjacent the photodetector. As the photon exits the opposite end of the bristle, the photon is received and detected by the photodetector.

The ends 20 of the fiber optic bristles 16 may be positioned perpendicularly to the scintillating material in order to receive the photons. The bristles may be densely packed at their ends 20 so as to cover substantially all of the surface of the scintillating material. An open end of each fiber optic bristle faces towards the scintillating material. The ends abut the scintillating material. The bristle fibers are routed longitudinally along or circumferentially around the scintillation material 14 and/or a housing 12 towards the photocell. These bristle fibers may be free, bundled, or wrapped around the scintillating material. The flexible, yet rugged, fiber threads allow for thermal expansion in the radial and axial directions at elevated temperatures.

Figure 2:
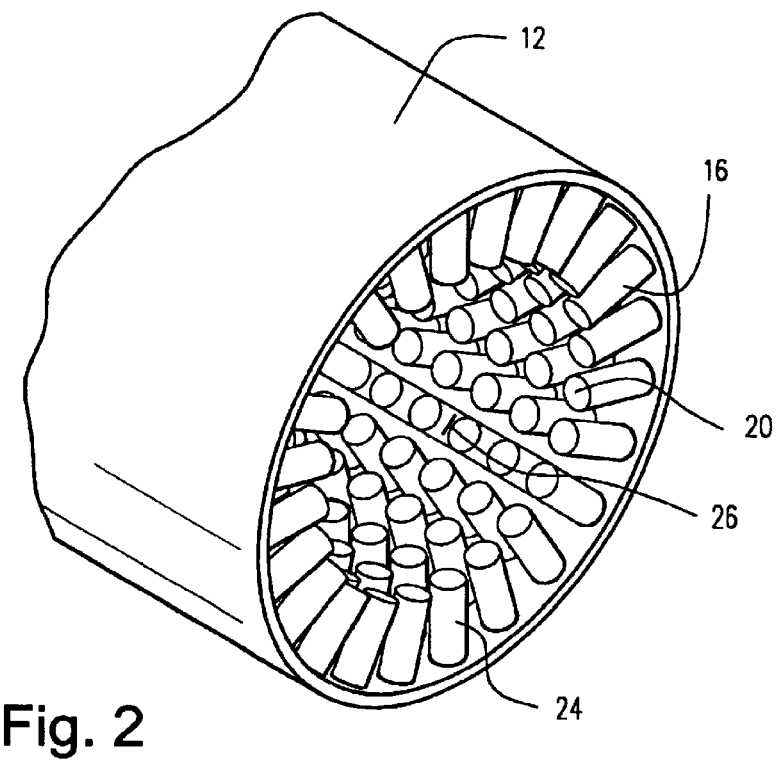
FIG. 2 is a perspective view of a section of a fiber optic brush.

As shown in FIG. 2, an array of bristles 16 form a fiber optics brush 24, surrounding the scintillation material 14. The first ends 20 of the bristles cover the surface of the scintillation material such that light photons emitted from the material are captured by one of the bristles. The bristles are flexible and the first ends 20 bend to receive the scintillation material, which may be slid into and out of the bristles. The bristles are flexible so that any thermal expansion of the bristles and/or the scintillation material due to extremely high temperatures and/or pressures is accommodated by slight bending of the bristles. The flexure of the bristles is not so great as to tilt the first ends away from the surface of the scintillation material.

The bristles of the brush capture photons exiting the sides and ends of the scintillation material. The first ends of the bristles are arranged to a hollow cavity 26 having an open rear end 30 and a close end 28. The cavity 26 receives the scintillating material. Some of the bristles may extend inwardly towards the front surface of the scintillating material so as to capture photons passing through the front. Similarly, some of the bristles 16 may be arranged such their first ends abut a rear end 32 of the scintillating material. Alternatively, the end of the scintillating material may be exposed and facing the photodetector such that light photons from the rear end 32 travels directly into the photodetector without need for a fiber optic path.

The bristles may be densely packing together such that the first ends 20 of the bristles form a nearly continuous surface of light capturing conduits. The surfaces of bristle ends 20 cover substantially the entire surface of the scintillating material, except possible for the rear end 32 of the scintillating material. The dense packing of bristles allows an increase in the amount of light to be captured that is generated by the scintillation effects.

The fiber optic brush has bristles that are flexible at ambient and elevated temperatures. The brush bristles compress and flex with the thermal expansion of the scintillation material, while being strong enough to withstand a downhole drilling environment when surrounded by the proper suspension system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fiber optic brush comprising:
   an array of fiber optic bristles each having a first end forming a hollow chamber adapted to receive a scintillating material, and
   said bristles having a second end connectable to a photodetector such that light entering the first end of a bristle is conveyed by the bristle through the second end and to the photodetector.

2. A fiber optic brush as in claim 1 wherein the hollow chamber is cylindrical.

3. A fiber optic brush as in claim 1 wherein the fiber optic bristles are mounted along an inner surface of a housing, and said housing is adapted to receive the scintillating material.

4. A fiber optic brush as in claim 1 wherein the fiber optic bristles are mounted along an inner surface of a housing, and said housing is adapted to receive the scintillating material and the photocell.

5. A fiber optic brush as in claim 1 wherein the first ends of the fiber optic bristles are densely packed together.

6. A fiber optic brush as in claim 1 wherein the fiber optic bristles extend axially along the scintillating material towards a position at an end of the material.

7. A fiber optic brush as in claim 1 wherein the fiber optic bristles extend axially along the scintillating material towards the photocell mountable at an end of the material.

8. A fiber optic brush as in claim 1 wherein the first end of the bristles are flexible to accommodate the scintillating material.

9. A fiber optic brush as in claim 1 wherein the first ends of the bristles form a cylindrical cavity having a first open end and an opposite cavity end populated by said first ends.

10. A fiber optic brush as in claim 9 wherein the scintillating material slides into the cavity, and said photodetector is mountable adjacent the open end of the cavity.

11. A fiber optic brush as in claim 9 wherein the scintillating material is wrapped within the brush, and said photodetector is mountable adjacent the open end of the cavity.

12. A scintillating instrument comprising:
   a housing;
   a scintillating material mountable within the housing;
   a photodetector mountable within the housing;
   a fiber optic brush in the housing between an outer wall of the housing and the scintillating material, wherein said fiber optic brush further comprises:
   an array of fiber optic bristles each having a first end and said array forming a hollow chamber around the scintillating material, wherein said first ends of the bristles abut the scintillating material, and
   said bristles having a second end adjacent the photodetector such that light entering the first end of a bristle is conveyed by the bristle to the second end and to the photodetector.

13. A scintillating instrument as in claim 12 wherein the scintillating instrument is a down bore-hole instrument.

14. A scintillating instrument as in claim 12 wherein the fiber optic bristles are mounted along an inner surface of the housing and extend rearward of the scintillating material to the photodetector.

15. A scintillating instrument as in claim 12 wherein the first ends of the fiber optic bristles are densely packed together.

16. A scintillating instrument as in claim 12 wherein the first end of the bristles are flexible to accommodate the scintillating material.

17. A scintillating instrument as in claim 12 wherein the first ends of the bristles form a cylindrical cavity having a first open end and an opposite cavity end populated by said first ends.

18. A scintillating instrument as in claim 17 wherein the scintillating material slides into the cavity and said photodetector is mountable adjacent the open end of the cavity.

19. A scintillating instrument as in claim 17 wherein the scintillating material is wrapped within the cavity and said photodetector is mountable adjacent the open end of the cavity.

20. A method for capturing light photons emitted from a scintillating material and conveying the photons to a light detector comprising:
   orienting a plurality of first ends of fiber optic bristles to face an outer surface of said scintillating material;

orienting a plurality of opposite ends of the bristles to face the photodetector, and capturing the light photons emitted by the scintillating instrument by the first ends of the bristles and conveying the photons through the bristles to the photodetector.

21. A method as in claim 20 wherein the first ends are densely packed together so as to substantially cover the outer surface of the scintillating material.

22. A method as in claim 20 further comprising arranging the fiber optic bristles along an inner surface of a housing containing the bristles and scintillating material, and extending the bristles rearward in the housing to the photodetector.

23. A method as in claim 20 wherein the first ends of the bristles are flexible to accommodate the scintillating material.

24. A method as in claim 20 wherein the first ends of the bristles form a cylindrical cavity having a first open end and having an opposite cavity end populated by said first ends.

25. A method as in claim 24 further comprising inserting the scintillating instrument into the cavity and said photodetector is mountable adjacent the open end of the cavity.

* * * * *